US010808745B1

(12) United States Patent
Javali et al.

(10) Patent No.: US 10,808,745 B1
(45) Date of Patent: Oct. 20, 2020

(54) RELEASABLE SLOT FASTENER (71) Applicant: A. RAYMOND ET CIE, Grenoble (FR)

(72) Inventors: Kunal Javali, Farmington Hills, MI (US); James Matthew Mell, Chesterfield, MI (US)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 16/599,228

(22) Filed: Oct. 11, 2019

(51) Int. Cl.
F16B 21/08 (2006.01)
F16B 5/06 (2006.01)

(52) U.S. Cl.
CPC ............ F16B 21/08 (2013.01); F16B 5/0642 (2013.01)

(58) Field of Classification Search
CPC ....... F16B 21/08; F16B 5/0642; Y10T 24/309
See application file for complete search history.

(56) References Cited

U.S. PATENT DOCUMENTS

| 5,324,151 | A | 6/1994 | Szudarek et al. | |
|---|---|---|---|---|
| 5,368,261 | A * | 11/1994 | Caveney | F16L 3/233 248/73 |
| 5,636,937 | A | 6/1997 | Zemlicka | |
| 6,203,364 | B1 | 3/2001 | Chupak et al. | |
| 6,536,718 | B2 * | 3/2003 | Benito-Navazo | H02G 3/30 248/224.8 |
| 6,715,185 | B2 * | 4/2004 | Angellotti | F16B 5/065 24/297 |
| 6,863,327 | B2 * | 3/2005 | Granger | B60R 13/04 24/297 |
| 7,055,783 | B2 * | 6/2006 | Rosemann | B60R 16/0215 24/297 |
| 7,152,281 | B2 * | 12/2006 | Scroggie | B60R 13/0206 24/297 |
| 7,165,371 | B2 * | 1/2007 | Yoyasu | B60R 13/04 24/292 |
| 7,178,206 | B2 * | 2/2007 | Kuhnle | B60R 13/0206 24/297 |
| 7,213,378 | B2 * | 5/2007 | Randez Perez | B60R 13/0206 24/297 |
| 7,306,419 | B2 * | 12/2007 | Lepper | F16B 21/086 411/453 |
| 7,337,505 | B1 * | 3/2008 | Scroggie | F16B 5/0657 24/297 |
| 7,487,575 | B2 * | 2/2009 | Smith | B60N 2/5825 24/297 |
| 7,534,134 | B2 | 5/2009 | Qiu | |

(Continued)

Primary Examiner — Robert Sandy
Assistant Examiner — Louis A Mercado
(74) Attorney, Agent, or Firm — Warner Norcross + Judd LLP (57) ABSTRACT This disclosure provides an improved slot fastener. The fastener includes a connector adapted for releasably connecting the fastener to an element comprising a T-slot. The fastener also includes an anchor adapted for installing the fastener on a component defining an aperture. This disclosure also provides a method of releasably coupling together a component and an element. The method includes installing the fastener on the component via the anchor and connecting the fastener to the T-slot of the element via the connector, thereby releasably coupling together the component and the element. This disclosure also provides an assembly, which includes a component releasably coupled to an element via the fastener.

15 Claims, 10 Drawing Sheets (56) References Cited

U.S. PATENT DOCUMENTS

| | | | |
|---|---|---|---|
| 7,669,807 B2 * | 3/2010 | Stigler | B60R 11/00 248/229.16 |
| 7,753,320 B2 | 7/2010 | Geiger et al. | |
| 7,762,503 B2 | 7/2010 | Franks | |
| 7,878,749 B2 * | 2/2011 | Edland | F16B 21/086 24/297 |
| 8,028,962 B2 * | 10/2011 | Geiger | F16L 3/13 248/74.3 |
| 8,221,042 B2 | 7/2012 | Vitali | |
| 8,585,121 B2 * | 11/2013 | Marx | B60R 13/0206 24/289 |
| 8,601,649 B2 | 12/2013 | Klein et al. | |
| 8,671,528 B2 * | 3/2014 | Hayashi | F16B 5/065 24/297 |
| 8,677,573 B2 * | 3/2014 | Lee | B60R 13/0206 24/289 |
| 8,883,059 B2 * | 11/2014 | Lewis | F16B 5/065 264/250 |
| 9,281,615 B1 | 3/2016 | Plaza et al. | |
| 9,511,544 B2 * | 12/2016 | Hemingway | B33Y 50/02 |
| 9,899,822 B2 * | 2/2018 | Richardson | B60R 16/0222 |
| 9,938,997 B2 * | 4/2018 | Iwahara | F16B 5/0657 |
| 9,956,925 B2 * | 5/2018 | Akazawa | F16B 5/0657 |
| 9,970,573 B2 | 5/2018 | Beyer et al. | |
| 9,982,694 B2 * | 5/2018 | Scroggie | F16B 19/008 |
| 10,131,291 B2 * | 11/2018 | Ishida | B60R 11/00 |

* cited by examiner

RELEASABLE SLOT FASTENER

FIELD OF THE INVENTION

The present disclosure generally relates to slot fasteners and, more specifically, to a releasable slot fastener and related methods and assemblies.

BACKGROUND OF THE INVENTION

Fasteners are used in various industries to secure together numerous types of components. In the automotive industry, for example, fasteners are used to fix one component to another in a vehicle assembly, secure together various panels and/or sheets (e.g. such as in joining door liner panels to door structures), and to fix certain components (e.g. electrical, hydraulic, and pneumatic connectors) to various structural elements such as panels, sheets, etc. Generally, such fasteners comprise two fastening elements that are each adapted to mate with at least one of the components to be secured together. These two fastening elements may be integrally formed (e.g. in one-piece fastener configuration) or each part of separate connectable elements (e.g. in a two-piece fastener configuration).

Unfortunately, many conventional fasteners suffer from drawbacks associated with poor fitment, inconvenient installation (e.g. requiring specific tools, cumbersome steps, etc.), and poor/no serviceability to do permanent installation.

SUMMARY OF THE INVENTION

An improved fastener is provided. The fastener is configured for releasably coupling together a component defining an aperture and an element defining a T-slot having a depression at an insertion end. The fastener comprises a T-shaped connector having a planar head extending longitudinally along an insertion axis between first and second ends, a shoulder projecting longitudinally outward from the head at the first end, a neck extending orthogonally from between lateral sides of the head, and a locking pawl projecting longitudinally outward from the neck along a curved path about the shoulder and through a top plane of the head. The fastener also comprises an anchor disposed at an end of the neck opposite the head of the connector. The T-shaped connector of the fastener is configured to be inserted within the insertion end of the T-slot, and the anchor of the fastener is adapted to be disposed within the aperture of the component.

A method of releasably coupling together a component and an element is also provided. The method includes installing the fastener on the component by disposing the anchor of the fastener within an aperture of the component, and connecting the fastener to the element via the connector, thereby releasably coupling together the component and the element. Connecting the fastener to the element includes inserting the connector into an insertion end of a T-slot defined by the element such that the locking pawl of the connector releasably engages a depression at the insertion end of the T-slot, thereby retaining the head of the connector therein.

An assembly comprising the component releasably coupled to the element via the fastener is also provided.

These and other features and advantages of the present disclosure will become apparent from the following description of particular embodiments, when viewed in accordance with the accompanying drawings and appended claims.

DETAILED DESCRIPTION OF THE INVENTION

An improved fastener is provided. As described herein, the fastener is configured for releasably coupling together a component defining an aperture and an element defining a T-slot. The fastener is adapted for use by hand (i.e., without need for a tool or other specialized equipment), and may be uncoupled from the element, and optionally withdrawn from the T-slot, without disassembly or removal of the fastened component. Moreover, the unique design of the fastener allows for increased usability and convenience, reduced maintenance, and reduced number of parts.

Referring generally to the Figures, wherein like numerals indicate corresponding parts throughout the several views, the fastener is illustrated and generally designated at 20. Certain features of the fastener 20 are functional, but can be implemented in different aesthetic configurations.

As shown in FIGS. 1 and 8-13, and as described in further detail below, the fastener 20 is adapted to connect/be connected to a T-slot generally designated at 100. The T-slot 100 includes a channel 102 that extends longitudinally between an open insertion end 104 and a second end 106. As shown in FIG. 1A, the T-slot 100 may be open-ended, such that the second end 106 may be designated or otherwise referred to as an open end 106a. However, as shown in FIG. 1B, the second end 106 may comprise one or more rear walls 108, such that the second end 106 may be designated or otherwise referred to as a closed end 106b. In such instances, the T-slot 100 may itself be referred to as a "closed-ended" T-slot 100. Regardless of the particular configuration of the T-slot 100, the channel 102 is typically bounded transversely by opposing side walls 110, and axially by a base 112 and lips 114. As will be understood by those of skill in the art, slots encompassed by the T-slot 100 include those designated or otherwise described as T-slots, C-channels (e.g. closed C-channels), parallel flange channels, structural channels, etc. As such, the side walls 110 may be referred to as "flanges", the base 112 as a "web", the lips 114 as "returns", etc. However, as will be understood in view of the description herein, slots suitable for use in combination with the fastener 20, i.e., as the T-slot 100, include a depression 116 in the base 112 at the insertion end 104. The depression 116 is bounded at the insertion end 104 by a ledge 118. One particular example of the T-slot 100 includes the connector designated EWCAP 005-23 under the Electrical Wiring Component Application Partnership by the United States Council for Automotive Research. In general, the T-slot 100 is defined by, or otherwise composes, a portion of an element, which is generally designated at 120 for reference herein and is not particularly limited. Examples of elements 120 include electrical connector housings and/or components (e.g. male/female plugs, sockets, etc.).

With regard to the embodiments of the present disclosure, the fastener 20 generally includes a T-shaped connector portion 22 (the "connector 22") and an anchoring portion 64 (the "anchor 64"), which are described in turn below.

The connector 22 is configured to be disposed within the T-slot 100, e.g. via insertion from the insertion end 104 of the T-slot 100. As such, it will be appreciated that the particular dimensions of the connector 22, and the various portions thereof described herein, are generally cooperatively selected in view of the T-slot 100 such that the shape/size of the connector 22 complements the interior shape/size of the T-slot 100 (i.e., such that the connector 22 generally corresponds to the volume of the channel 102).

The connector 22 includes a generally planar head 24 that extends longitudinally between a first end 26 and a second end 28, transversely between lateral sides 30, and axially between a first side 32 and a second side 34. The first side 32 presents an outer surface 36, which generally defines a top plane 38. The second side 34 presents lateral retaining surfaces 40 disposed at opposing edges along the opposing lateral sides 30.

Figure 1A:
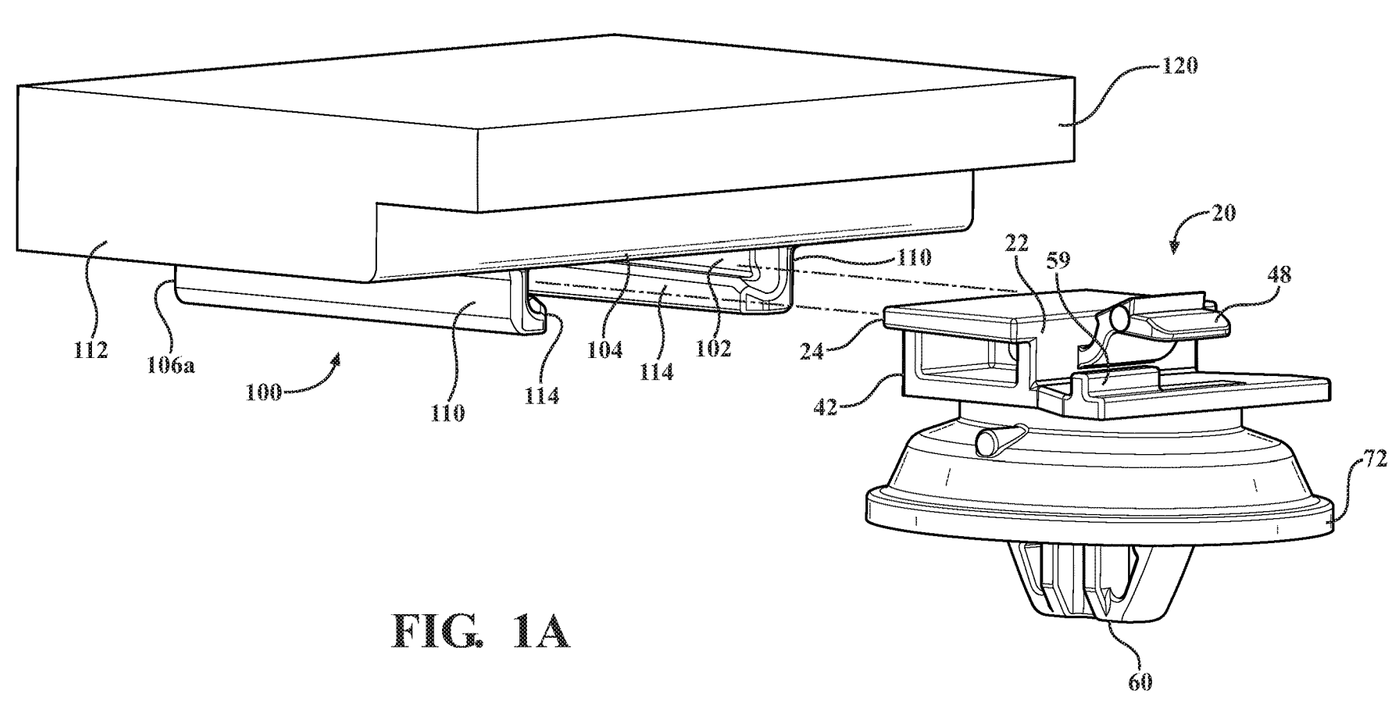
FIG. 1A is a perspective view of a fastener aligned for insertion into an open-ended T-slot in accordance with one embodiment of the disclosure.
Figure 1B:
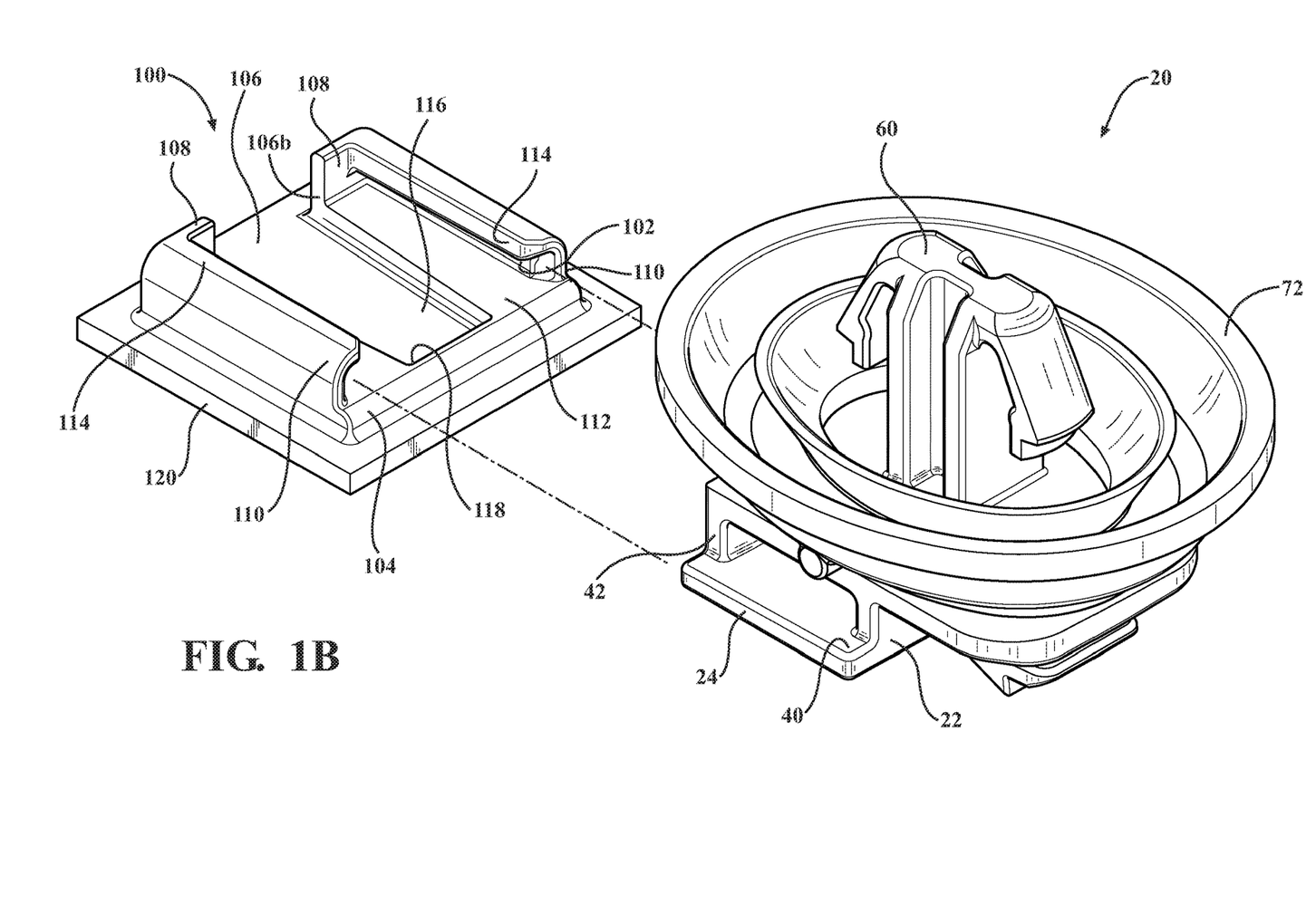
FIG. 1B is a perspective view of a fastener aligned for insertion into a closed-ended T-slot in accordance with another embodiment of the disclosure.
Figure 2:
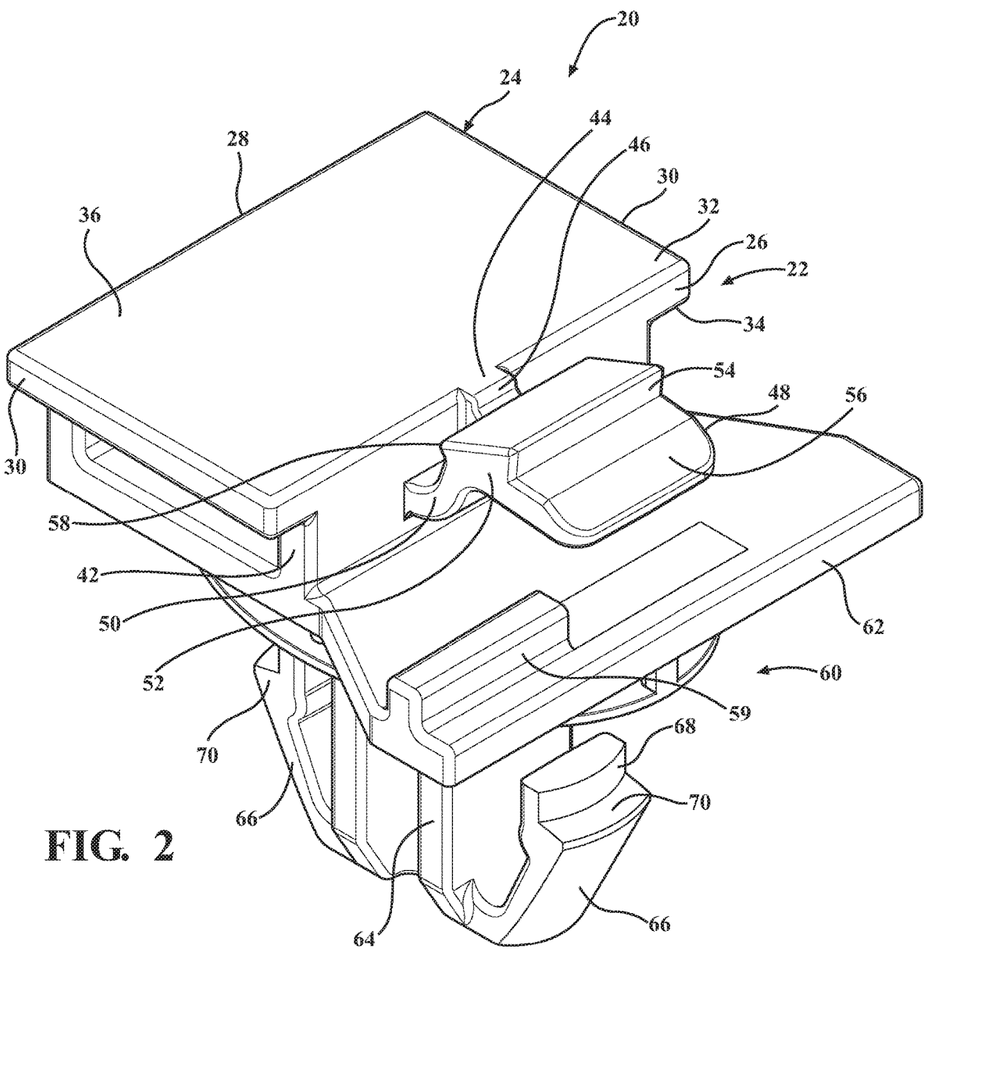
FIG. 2 is a perspective view of the fastener in accordance with another embodiment of the disclosure.
Figure 3:
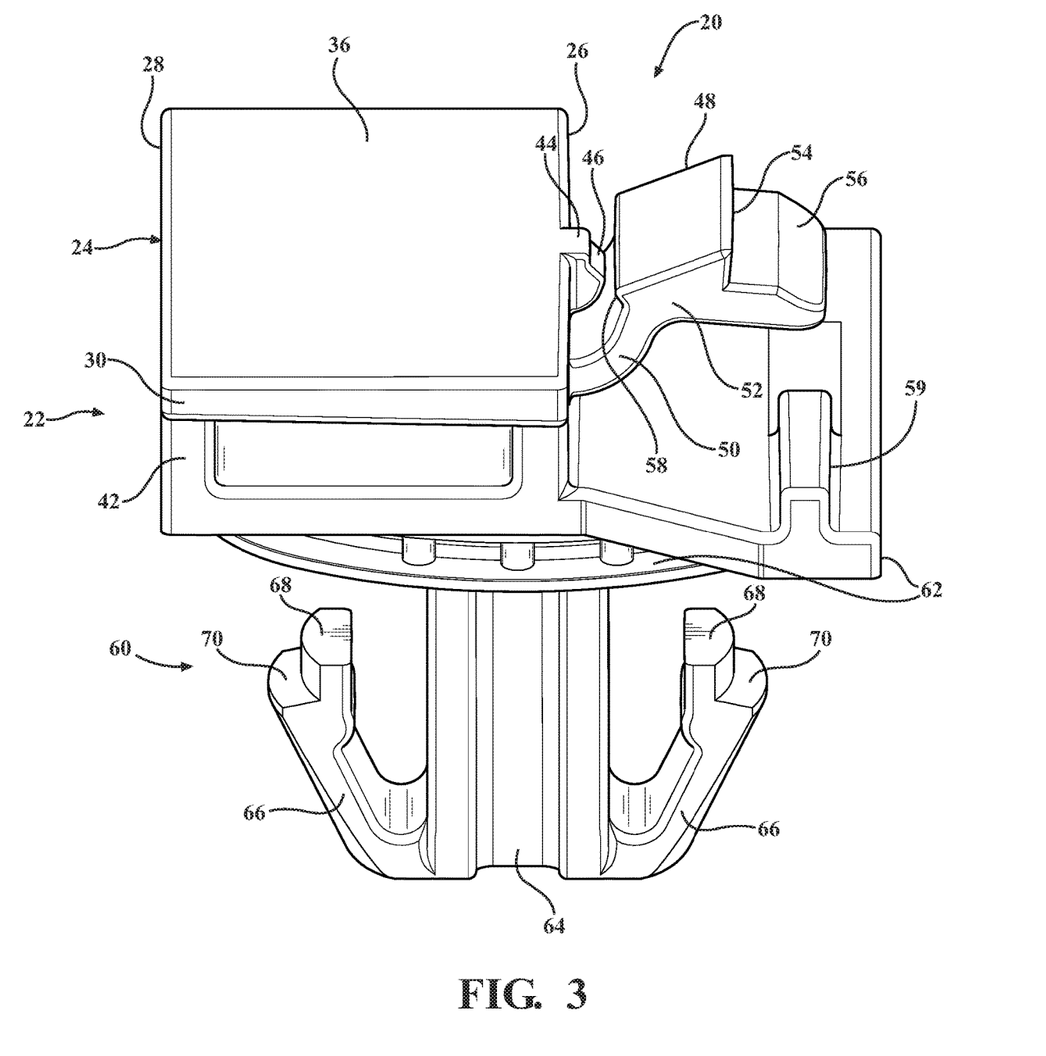
FIG. 3 is an additional perspective view of the fastener in accordance with the embodiment of FIG. 2.
Figure 4:
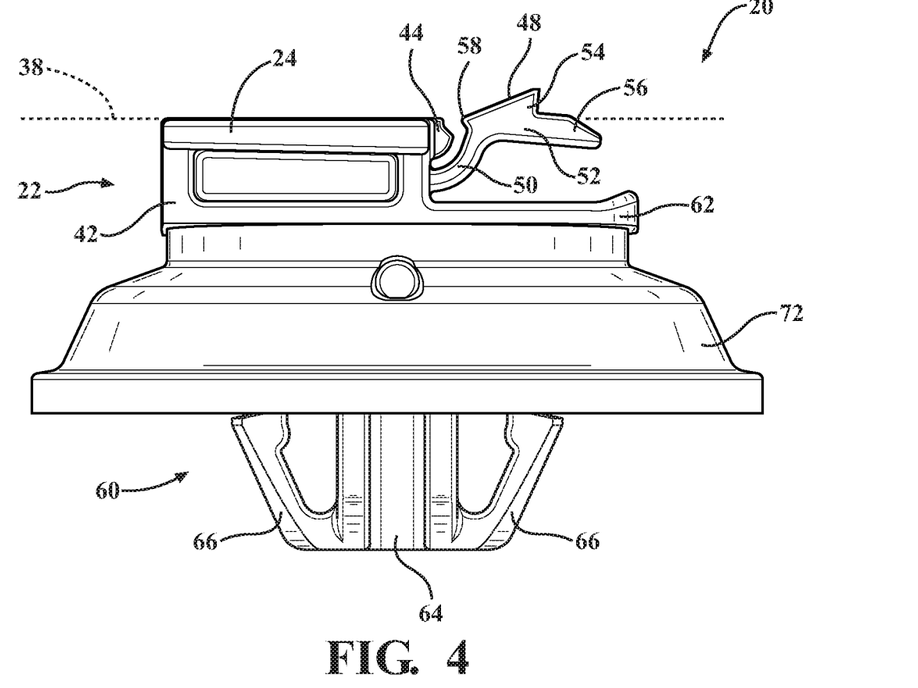
FIG. 4 is a side elevation view of the fastener in accordance with one embodiment of the disclosure.
Figure 5:
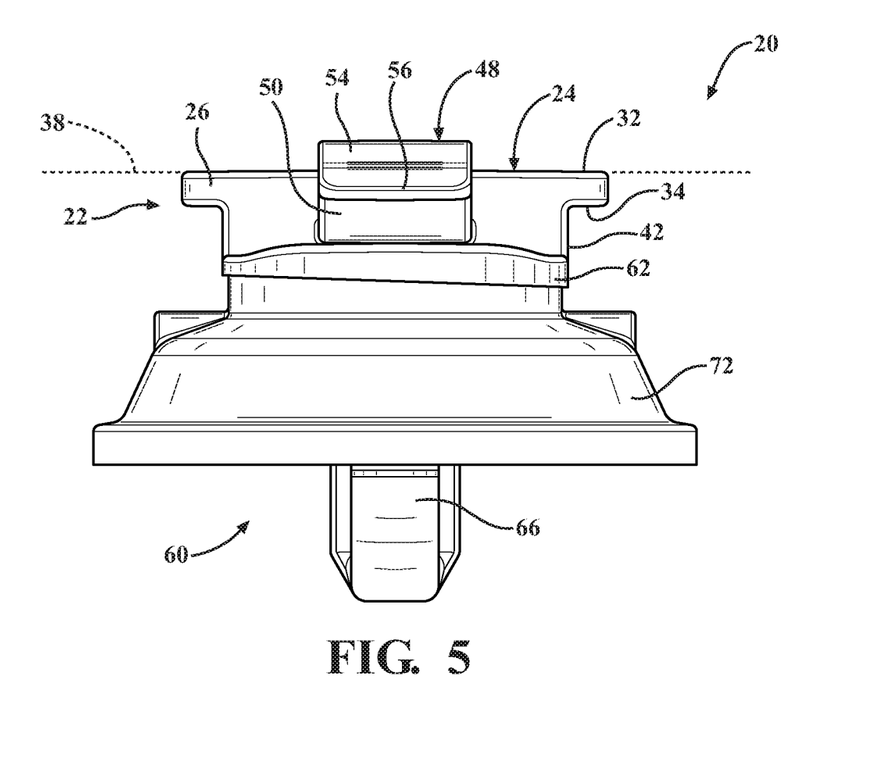
FIG. 5 is a front elevation view of the fastener in accordance with the embodiment of FIG. 4.
Figure 6:
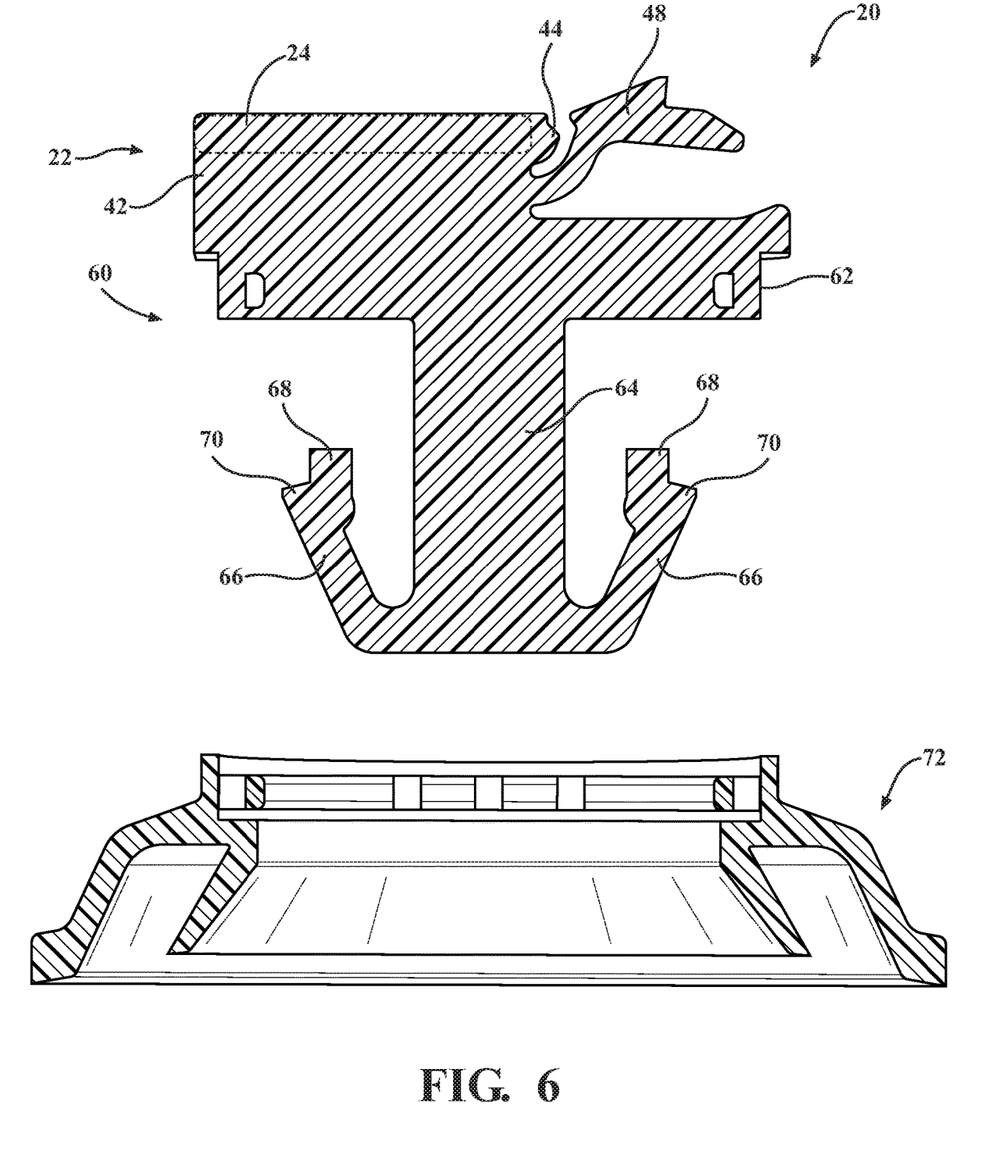
FIG. 6 is an exploded cross-sectional view of the fastener in accordance another embodiment of the disclosure.
Figure 7:
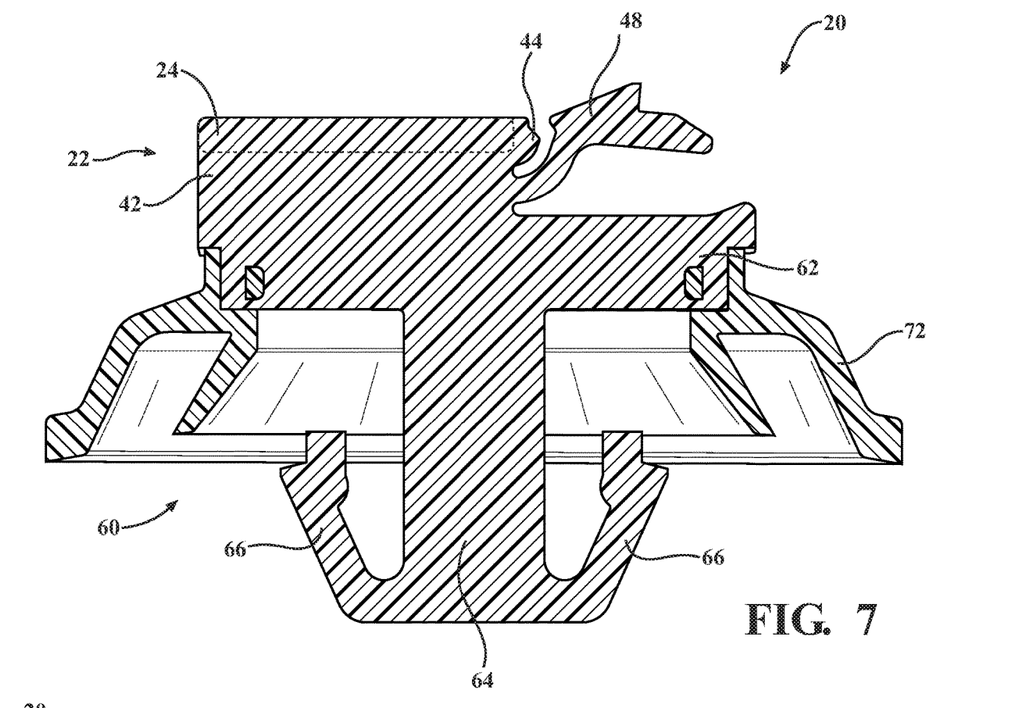
FIG. 7 is a cross-sectional view of the fastener in accordance one embodiment of the disclosure.
Figure 8:
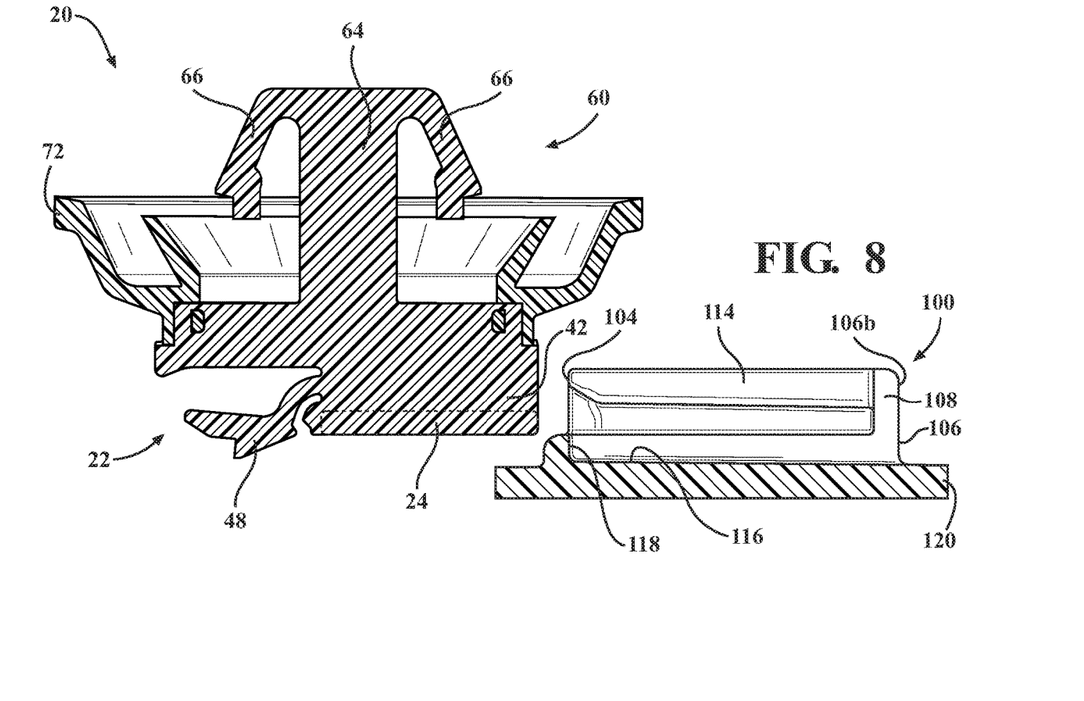
FIG. 8 is a cross-sectional view of the fastener aligned for insertion into a closed-ended T-slot in accordance with one embodiment of the disclosure.

The connector 22 includes a neck 42 and a shoulder 44. The neck 42 is disposed orthogonal to the head 24, and axially extends from the second side 34 of the head 24 between the lateral retaining surfaces 40. The neck 42 has a lateral width less than the lateral width of the head 24, such that the head 24 and the neck 42 collectively define the general "T-shape" of the connector 22 (i.e., when viewed along the longitudinal axis thereof, e.g. as shown in FIG. 5). In general, the neck 42 has a longitudinal length corresponding to (i.e., substantially the same as) the length of the head 24, such that the first and second ends 26, 28 of the head 24 correspond to the longitudinal bounds of the neck 42. The shoulder 44 projects longitudinally outward from the first end 26 of the head 24. Typically, the shoulder 44 includes a concave portion 46, as described in further detail below. In certain embodiments (not shown), the shoulder 44 extends transversely along a substantial portion of the width of the head 24. As will be appreciated from the description herein, however, the shoulder 44 need not have a similar width as the head 24. As such, in some embodiments the shoulder 44 instead comprises a lesser width than the head 24 (e.g. to save material, reduce manufacturing cost, reduce weight, etc.). In such embodiments, the shoulder 44 is general centered laterally with respect to the head 24 and/or the longitudinal axis of the connector 22.

The connector 22 includes a locking pawl 48, which projects longitudinally outward along a curved path from the neck 42 proximal the shoulder 44. More specifically, the locking pawl 48 extends about the shoulder 44 and through the top plane 38 of the head 24. In general, the locking pawl 48 and the shoulder 42 are centered laterally with respect to each other.

Figure 9:
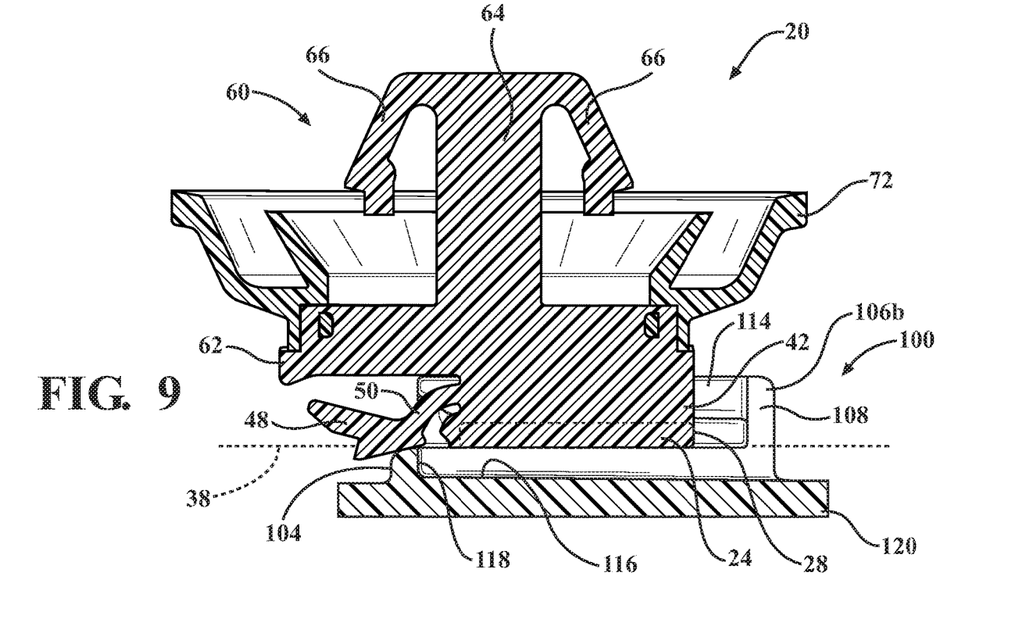
FIG. 9 is a cross-sectional view of the fastener partially-inserted into the closed-ended T-slot in accordance with the embodiment of FIG. 8.
Figure 10:
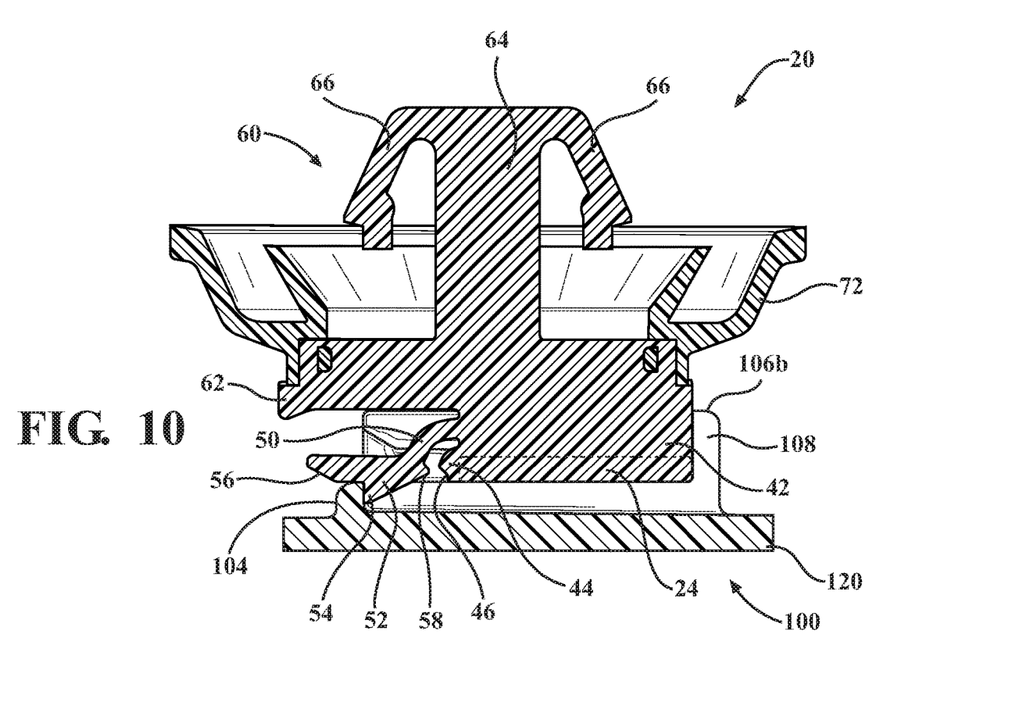
FIG. 10 is a cross-sectional view of a subassembly including the fastener releasably retained within the closed-ended T-slot in accordance with the embodiment of FIGS. 8 and 9.

Typically, the locking pawl 48 comprises a curved arm 50 that extends from the neck 42 to an engagement portion 52 that is adapted to engage the ledge 118 of the T-slot 100 (i.e., when the connector 22 is disposed therein) to releasably prevent removal of the connector 22 from the T-slot 100, as described in further detail below. The curved arm 50 is resiliently flexible, such that the locking pawl 48 can be deflected from its natural position to a release/insertion position, as shown in FIG. 9.

In certain embodiments, the locking pawl 48 comprises a tooth 54 projecting axially outward from the engagement portion 52. The tooth 54 is configured to be disposed within the depression 116 of the T-slot 100 and contact an inner surface of the ledge 118 when the connector 22 is disposed within the T-slot 100. In some embodiments, the tooth 54 comprises an inwardly-tapered shape providing a decreased resistance to insertion of the connector within the T-slot 100, e.g. by providing a surface to contact the base 112 at the insertion end of the T-slot and deflect the engagement portion 52 away therefrom and place the locking pawl 48 into the release position.

In some embodiments, the locking pawl 48 comprises a release tab 56 projecting longitudinally outward from the engagement portion 52. The release tab 56 is generally configured to extend over the ledge 118 when the connector 22 is disposed within the T-slot 100. As will be appreciated from the description herein, the release tab 56 is adapted to be manipulated by a user (e.g. toollessly (i.e., by hand) or with a tool) to pivot/deflect the locking pawl 48 from its natural position to the release position.

The locking pawl 48 includes an inwardly facing heel 58. The heel 58 is configured to engage the shoulder 44 (e.g. the concave portion 46 thereof) when the engagement portion 52 of the locking pawl 48 is deflected toward the head 24. In this fashion, the shoulder 44 obstructs movement of the locking pawl 48 when deflected toward the first end 26 of the head 24 by contacting the heel 58.

In certain embodiments, the connector 22 includes a stop 59, which is adapted to limit how far the connector 22 may be inserted into the T-slot 100. Typically, as shown in FIGS. 1A, 2, 3, and 13, the stop 59 extends orthogonally and parallel to the neck 42, and is disposed opposite the neck for 42 about the locking pawl 48. The stop 59 is not particularly limited, and may comprise a separate element of the fastener 20 and/or the connector 22, or instead may itself be a component of an element of the fastener 20 and/or the connector 22. For example, the stop 59 may extend from a portion of the connector 22 (e.g. the head 24, the neck 42, etc.), or the anchor 20 (e.g. from one of the elements of the anchor 20 described below).

As introduced above, the stop 59 is adapted to limit how far the connector 22 may be inserted into the T-slot 100. In particular, the stop 59 is adapted to engage (e.g. contact) a portion of the T-slot 100 (e.g. one or both of side walls 110 and/or lips 114, or the base 112) at the insertion end to prevent further insertion of the connector 22 into the T-slot 100 when the locking pawl 48 has engaged the depression 116 of the T-slot 100. In this fashion, the stop 59 prevents over-insertion of the connector 22 within the T-slot 100, such that the fastener 20 is itself adapted to connected to the element 120 via a tight connection (i.e., with minimized rattling, noise, etc. from relative movement between the connector 22 and the T-slot 100 when installed). Moreover, the stop 59 allows the fastener 20 to be utilized in combination with the T-slot 100 comprising the open-ended configuration described above (i.e., where the second end 106 is further defined as the open end 106a), instead of otherwise relying on rear walls 108 of the closed end 106b limiting the length of insertion of the connector 22 within the T-slot 100 (i.e., when the T-slot 100 comprises the closed-ended configuration, where the second end 106 is further defined as the closed end 106b). However, while shown in the Figures in combination with the T-slot 100 in the open-ended configuration, it is to be appreciated that the stop 59 does not preclude the used of the fastener 20 with closed-ended T-slots 100 but may instead provide the fastener 20 with increased fitment with regard to the T-slot 100 and/or the element 120 comprising the same, e.g. by providing an additional point of contact between the fastener 20 and the T-slot 100 in addition to the rear walls 108.

Figure 11:
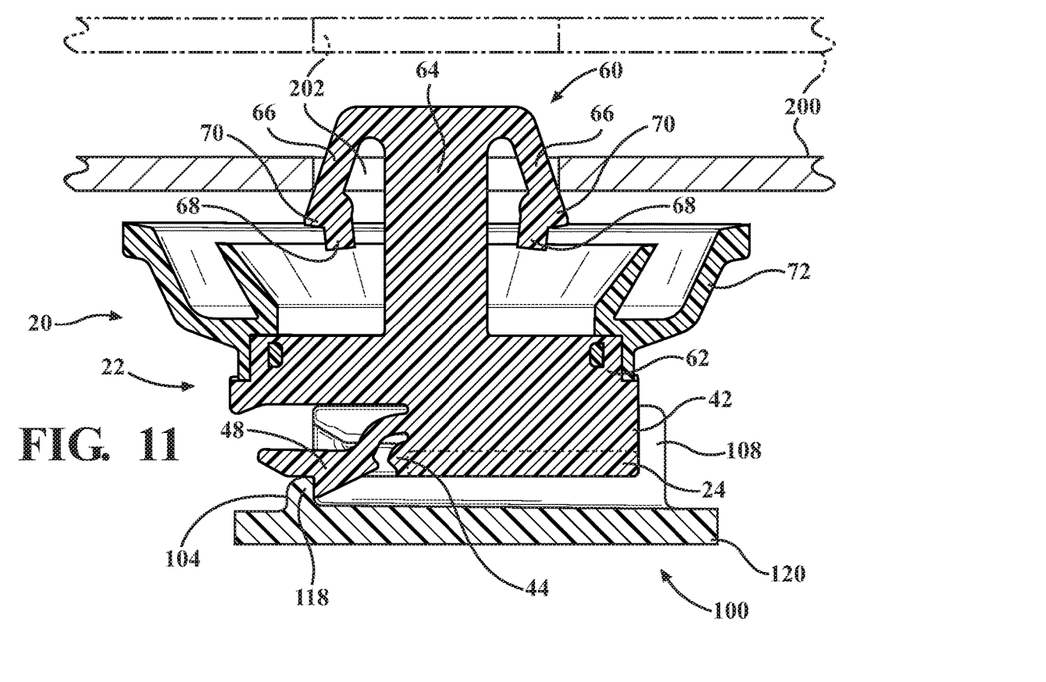
FIG. 11 is a cross-sectional view of the subassembly of FIG. 10 aligned for installation on a component in accordance with one embodiment of the disclosure.
Figure 12:
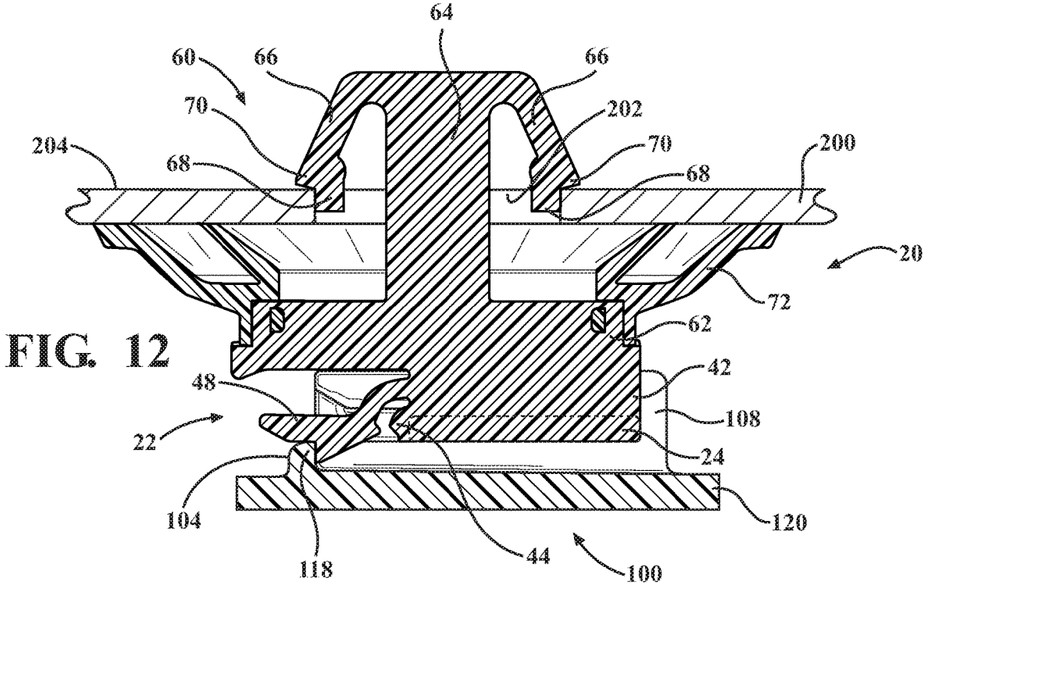
FIG. 12 is a cross-sectional view of an assembly including a component and an element releasably coupled together via the fastener in accordance with another embodiment of the disclosure.
Figure 13:
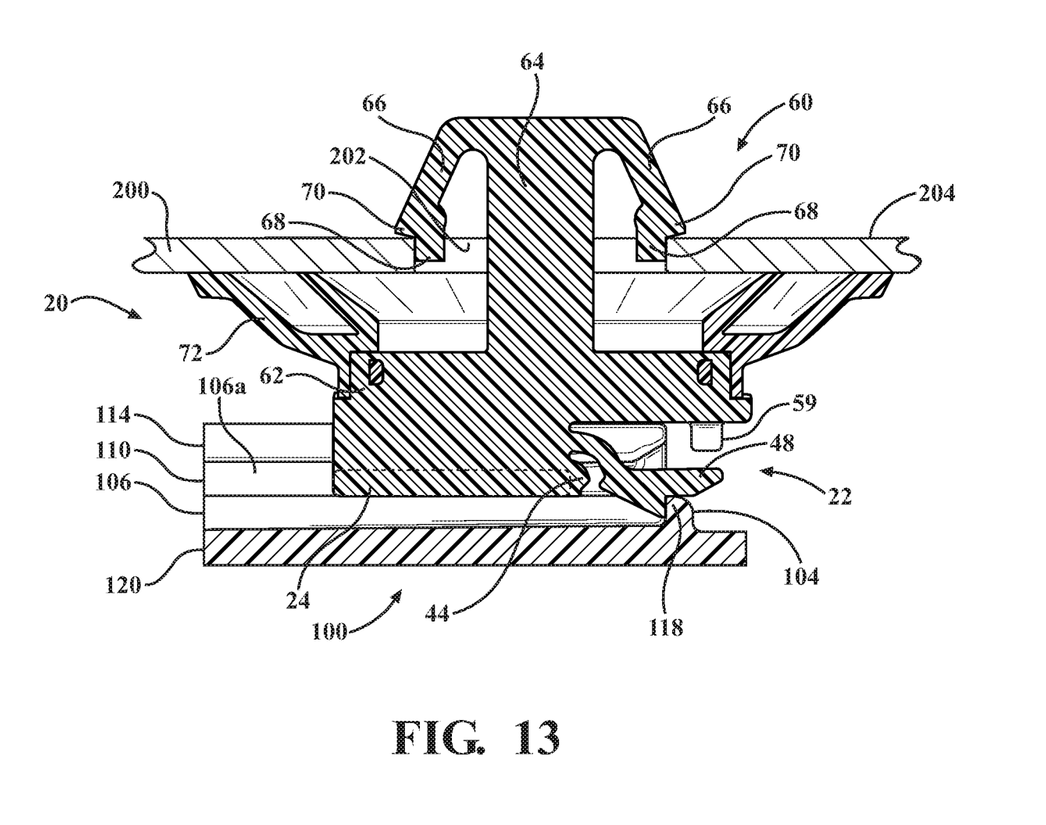
FIG. 13 is a cross-sectional view of an assembly including a component and an element releasably coupled together via the fastener in accordance with another embodiment of the disclosure.

As introduced above, the fastener 20 includes the anchor 60. The anchor 60 is adapted for fixing the fastener 20 to a component, which is generally shown in FIGS. 11-12 and designated at 200. The component 200 is not generally limited, and may be, for example, any structure on/to which an article (e.g. the element 120 comprising the T-slot 100) may be secured, as will be understood in view of the embodiments described herein. Typically, the component is a panel (e.g. of a building, console, instrument panel, fascia, board, dashboard etc.), stud, or other such structure comprising a surface adjacent which the fastener 20 may be disposed.

In general, the anchor 60 includes a body 62 disposed at an end of the neck 42 opposite the head 24, such that the neck 42 extends between the head 24 and the body 62. The body 62 is typically dimensioned to comprise a longitudinal length greater than the lengths of the head 24 and the neck 42 of the connector 22, optionally greater than the length of the connector 22 as a whole, and equal to or less than the length of the T-slot 100. So configured, when the connector 22 is disposed within the T-slot 100, the body 62 does not extend over the side of the T-slot at the insertion end 104. Typically, the connector 22 is configured to be disposed between the insertion and second ends 104, 106 of the T-slot 100, such that the connector 22 comprises an insertion length (i.e., the longitudinal length between outermost longitudinally portions) equal to or less than the distance between the outermost portions of the insertion and second ends 104, 106 of the T-slot 100. In certain embodiments, the body 62 and the connector 22 are so configured, and each comprise an insertion length equal to or less than the distance between the outermost portions of the insertion and second ends 104, 106 of the T-slot 100.

The anchor 60 includes a shank 64 extending axially outward from the body, i.e. orthogonally away from the connector 22. In general, the shank 64 is adapted to be disposed within an aperture 202 defined by the component 200, and is otherwise not particularly limited. In certain embodiments, the shank 64 is threaded such that the anchor 60 may be defined as a threaded fastener. In other embodiments, the shank 64, or one or more portions thereof, is expandable, and the anchor 60 may be defined as a push-type fastener. The shank 64 may comprise an oblong, square, or other such cross-sectional shape along its length, or a portion with such a shape, to minimize and/or prevent rotation of the shank 64 when disposed into the aperture 202. As such, it is to be appreciated that the anchor 60 may comprise or otherwise be defined as an anti-rotation fastener.

In certain embodiments, the anchor 60 comprises a plurality of arms 66 projecting radially outward from the shank 64 and toward the body 62. Each of the arms 66 can be radially twisted about the shank 64 (i.e., in a screw-type fashion), coplanar with respect to the length of the shank 64, or transversely offset from the shank 64. It is to be appreciated that, although but two of the arms 66 are generally shown in the Figures, the anchor 60 may comprise more than two of the arms 66, such that the plurality of arms 66 may comprise 3, 4, 5, 6, or more individual arms 66. Each of the arms 66 is each resiliently deflectable inwardly toward the shank 64, and thus may be deflected in response to a deflecting force (e.g. from contact with a perimeter of the aperture 202 of the component 200, as shown in FIGS. 11 and 12) but will otherwise return to and/or maintain a natural position relative to the shank 64. In general, each of the arms 66 includes a terminal portion 68 configured to abut a surface 204 of the component 200 disposed radially outward from the aperture 202 (i.e., when the shank 64 has been disposed into the aperture 202). In certain embodiments, each of the arms 66 comprises a catch 70 configured to engage the perimeter of the aperture 202 during insertion of the shank 64 into the aperture 202, as shown in FIG. 12, preventing premature removal of the shank 64 from the aperture 202 (i.e., prior to installing the fastener 20 on the component 200 by disposing the shank 64 far enough into the aperture 202 to allow the arms 22 to return to their natural position beyond the radius of the aperture 202).

As illustrated by the embodiments exemplified in FIGS. 1 and 4-13, the fastener may comprise an outwardly extending flange 72 disposed about the anchor 60. The flange 72 is generally configured to provide a compressive force against the component 200 when the fastener 20 is installed thereon and the component 200, as illustrated in the sequence shown in FIGS. 11-12. In this fashion, the flange 72 may be utilized to limit relative movement between the fastener 20 and the component 200 (e.g. to prevent noise, rattling, etc.), seal the aperture 202 from leakage, etc.

The various component parts of the fastener 20 described above (e.g. the connector 22, the anchor 60, the flange 72), and portions of such component parts (e.g. the head 24, the arms 66, etc.) may be manufactured of the same or different material(s), such as any one or more of the materials described below. For example, in some embodiments, the fastener 20 is monolithic in construction and substantially homogeneous in composition with respect to the connector 22 and the anchor 60. However, the fastener 20 may comprise multiple component parts of varying compositions joined together (e.g. the flange 72 joined to the monolithic construction comprising the connector 22 and the anchor 60). Moreover, each component part may itself comprise a combination of different materials, and thus may not comprise a homogeneous composition throughout. In general, materials suitable for use in or as the fastener 20 and/or the component parts thereof (e.g. the connector 22, the anchor 60, the flange 72, and the various portions thereof) include metals (e.g. steels, aluminums, alloys, etc.), resins (e.g. thermoset and/or thermoplastic resins), and combinations thereof. However, myriad materials may be used to manufacture the component parts and various elements of the fastener 20, with each typically being selected as a function of availability, cost, performance/end use applications, etc. As such, metals, metal alloys, resins are not exhaustive of suitable materials that may be used. Additionally, it is to be appreciated a surface or portion thereof of a particular component part of the fastener 20 may be coated, painted, and/or impregnated with a material having desired characteristics including, but not limited to, those described above or below. Moreover, one of skill in the art will readily appreciate that particular materials will be selected based on the features and/or functions of the fastener 20 or particular component parts thereof (e.g. the flexibility and resiliency of the locking pawl 48 and the arms 66, the resiliency and directional deformability of the flange 72, etc.).

In various embodiments, the fastener 20 comprises a resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the resin is selected from thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxyalkylenes; polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof. In certain embodiments, the resin comprises a polyamide, a polyoxymethylene, or a combination thereof. In specific embodiments, the resin comprises, alternatively consists essentially of, alternatively consists of PA66 (i.e., Nylon 66, polyamide 66, etc.), polyoxymethylene (i.e., POM, polyacetal, etc.), or a combination thereof.

A method of releasably coupling together the component 200 and the element 120 with the fastener 20 is also provided. The method includes installing the fastener 20 on the component 200 and connecting the fastener 20 to the T-slot 100, thereby releasably coupling together the component 200 and the element 120.

Installing the fastener 20 on the component 200 generally comprises disposing the shank 64 of the anchor 60 of the fastener 20 within the aperture 202 of the component 200 such that the shank 64 is retained within the aperture 202. In certain embodiments, installing the fastener 20 comprises disposing the shank 64 into the aperture 202 until the arms 66 return to their natural position relative the shank 64 such that the terminal portion 68 of each arm 66 abuts the surface 204 of the component 200, as illustrated in the sequence shown in FIGS. 11-12. In some such embodiments, installing the fastener 20 further comprises compressing the flange 72 against the component 200.

Connecting the fastener 20 to the T-slot 100 generally comprises disposing the head 24 of the connector 22 of the fastener 20 within the channel 102 of the T-slot 100, with the fastener 20 oriented with respect to the T-slot 100 such that the second end 28 of the head 24 is proximal to the second end 106, the first end 26 of the head 24 is proximal to the insertion end 104, the locking pawl 48 is disposed within the depression 116, and the neck 42 is disposed between the lips 114. In this fashion, disposing the connector 22 within the channel 102 comprises inserting the connector 22 into the insertion end 104 of the T-slot 100 such that the second end 28 of the head 24 of the connector 22 is disposed proximal the second end 106 of the T-slot 100 (e.g. adjacent the rear wall(s) 108 at the closed end 106a when the T-slot 100 is closed-ended), and the locking pawl 48 of the connector 22 releasably engages the depression 116 (e.g. via the engagement portion 52 of the locking pawl 48 engaging the ledge 118 of the depression 116), thereby retaining the head 24 of the connector 22 within the channel 102. It will be appreciated that disconnecting the fastener 20 from the T-slot 100 generally comprises disengaging the locking pawl 48 from the depression 116, e.g. via moving/pivoting the locking pawl 48 into the release position (e.g. by manipulating the release tab 56), and withdrawing/extracting the connector 22 from the channel 102 out the insertion end 104.

It is to be appreciated that the particular actions of the method can be performed in any order. In certain embodiments, the method comprises connecting the fastener 20 to the T-slot 100 to prepare a first subassembly, and then installing the first subassembly on the component 200, as illustrated in the sequence shown in FIGS. 8-12. In other embodiments, the method comprises installing the fastener 20 on the component 200 (e.g. via the anchor 60) to prepare a second subassembly, and then connecting the second subassembly to the element 120 (e.g. via inserting the connector 22 into the T-slot 100). In either of such embodiments, the method prepares an assembly comprising the element 120 and the component 200 fastened together via fastener 20, as shown generally in FIG. 12.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular. Further, it is to be understood that the terms "right angle", "orthogonal", and "parallel" are generally employed herein in a relative and not an absolute sense.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A fastener for releasably coupling together a component and an element defining a T-slot having a depression at an insertion end, the fastener comprising:
   a T-shaped connector configured to be inserted within the T-slot from the insertion end, the connector comprising
   a planar head extending longitudinally between first and second ends, a shoulder projecting longitudinally outward from the head at the first end, a neck extending orthogonally from between lateral sides of the head, and a locking pawl projecting longitudinally outward from the neck along a curved path about the shoulder and through a top plane of the head; and
   an anchor disposed at an end of the neck opposite the head of the connector and adapted to be received within an aperture of the component.

2. The fastener of claim 1, wherein the locking pawl comprises an engagement portion adapted for engaging an edge of the depression of the T-slot and a curved arm extending from the neck of the connector to the engagement portion, the curved arm being resiliently flexible.

3. The fastener of claim 2, wherein the engagement portion comprises a tooth adapted to be disposed within the depression of the T-slot and abut the edge thereof.

4. The fastener of claim 2, wherein the engagement portion of the locking pawl is disposed beyond the top plane of the head relative the anchor in a locking position, and wherein the locking pawl is resiliently pivotable from the locking position to a release position whereby the engagement portion is positioned between the top plane of the head and the anchor.

5. The fastener of claim 1, wherein the locking pawl comprises a release tab that is adapted to be toollessly engaged for pivoting the locking pawl toward the anchor.

6. The fastener of claim 1, wherein the locking pawl comprises a heel configured to cooperatively engage the shoulder of the head to obstruct movement of the locking pawl beyond the first end of the head when pivoted thereto.

7. The fastener of claim 1, wherein the connector is configured to be disposed between the insertion end and a second end of the T-slot opposing the insertion end, such that the connector comprises an insertion length between outermost longitudinally portions equal to or less than a distance between the insertion and second ends of the T-slot.

8. The fastener of claim 1, wherein the connector further comprises a stop orthogonally extending parallel to and disposed opposite the neck about the locking pawl, the stop being adapted to limit insertion of the connector within the T-slot when inserted therein from the insertion end.

9. The fastener of claim 1, wherein the anchor comprises a body disposed at the end of the neck of the connector, a shank extending orthogonally from the body opposite the neck, and a plurality of arms projecting outwardly from the shank and toward the body, the arms being resiliently deflectable toward the shank.

10. The fastener of claim 1, further comprising an outwardly extending flange disposed about the anchor.

11. The fastener of claim 1, wherein: (i) the connector comprises a polymeric material; (ii) the anchor comprises a polymeric material; or (iii) both (i) and (ii).

12. The fastener of claim 1, wherein: (i) the connector and the anchor are integrally formed; (ii) the fastener is monolithic in construction; or (iii) both (i) and (ii).

13. A method of releasably coupling together a component and an element, the element defining a T-slot having a depression at an insertion end, said method comprising:
   providing a fastener, wherein the fastener is the fastener of claim 1;
   installing the fastener on the component via the anchor; and
   connecting the fastener to the element via the connector, thereby releasably coupling together the component and the element.

14. The method of claim 13, wherein installing the fastener on the component comprises disposing the anchor of the fastener within an aperture of the component; and wherein connecting the fastener to the element comprises inserting the connector into the insertion end of the T-slot such that the locking pawl releasably engages the depression of the T-slot thereby retaining the head of the connector in the T-slot.

15. An assembly comprising a component releasably coupled to an element via a fastener, wherein the fastener is the fastener of claim 1.

* * * * *